United States Patent Office 3,572,173
Patented Mar. 23, 1971

3,572,173
INDEXING DRIVE
Duane W. Woltjen, Manchester, Mo., assignor to UMC Industries, Inc., St. Louis, Mo.
Filed Apr. 16, 1969, Ser. No. 816,494
Int. Cl. B23q 17/04
U.S. Cl. 74—815                    5 Claims

ABSTRACT OF THE DISCLOSURE

Driving and driven shafts are supported in bearings which are permanently spaced apart at a definitely fixed center distance. On the driven shaft is a first support in the form of a flange for a circle of cam-follower rollers. On the drive shaft is a second support in the form of a flange for a cam means which drive the follower rollers around said circle. Each roller is borne upon a stud which extends through a flanged bushing. Each bushing closely but rotatably and removably fits into a hole in said first support and itself has an eccentric hole therethrough. Each stud is located in one of these eccentric holes. Each stud also has a stop at one end for engagement with the flange of the bushing, and is threaded on its end opposite to receive a draw nut reacting against said first support for clamping the flange of the bushing thereto, thereby to hold the bushing in any selected angular position on the support. By loosening the nut the bushing is released for rotary adjustment of the position of the center line of the roller which it supports, whereby the radii of the centers of any or all of the rollers may be changed. Each and every bushing, stud or roller, if damaged, is replaceable in its support, the support being protected against damage so that its replacement is not necessary in such an event.

BACKGROUND OF THE INVENTION

The field of the invention (included in Patent Office class 74, subclass 84) relates to cam and follower driving apparatus for converting continuous rotary motion to timed intermittent rotary motion in a given direction. Problems exist in this field relating to the necessity for eliminating backlash and effecting preloading contact between cams and followers while maintaining positively fixed shaft center distances so that drive units may be made economically interchangeable with machinery to be driven thereby. Another problem has been that failure at one follower support required extensive and costly replacements to effect repairs.

SUMMARY

Features of the invention are that (1) backlash motion is avoided and adjustable preloading may be effected between the cams and the followers while (2) variable center distances between drive and driven shafts are avoided, so that special compensating connections are unnecessary for making connections between units embodying the invention and standardized machines served thereby, and (3) provision is made for making individual follower element replacements upon damage in connection with one of them, without the necessity for extensive repair and replacement costs of their supports.

DESCRIPTION OF THE PREFERRED EMBODIMENT

Figure 1:
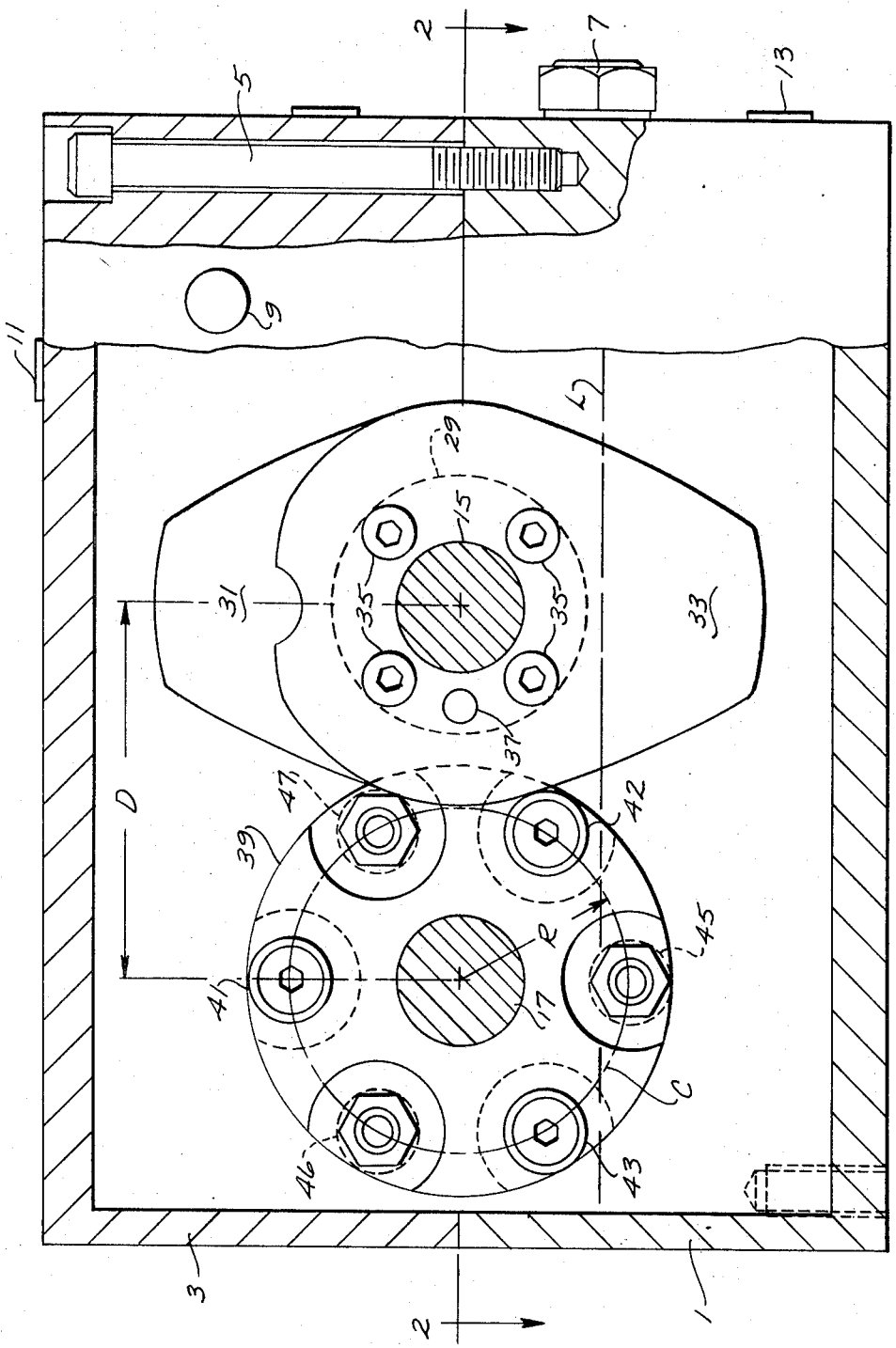
FIG. 1 is a vertical section, partly in elevation, of a drive unit embodying the invention.
Figure 2:
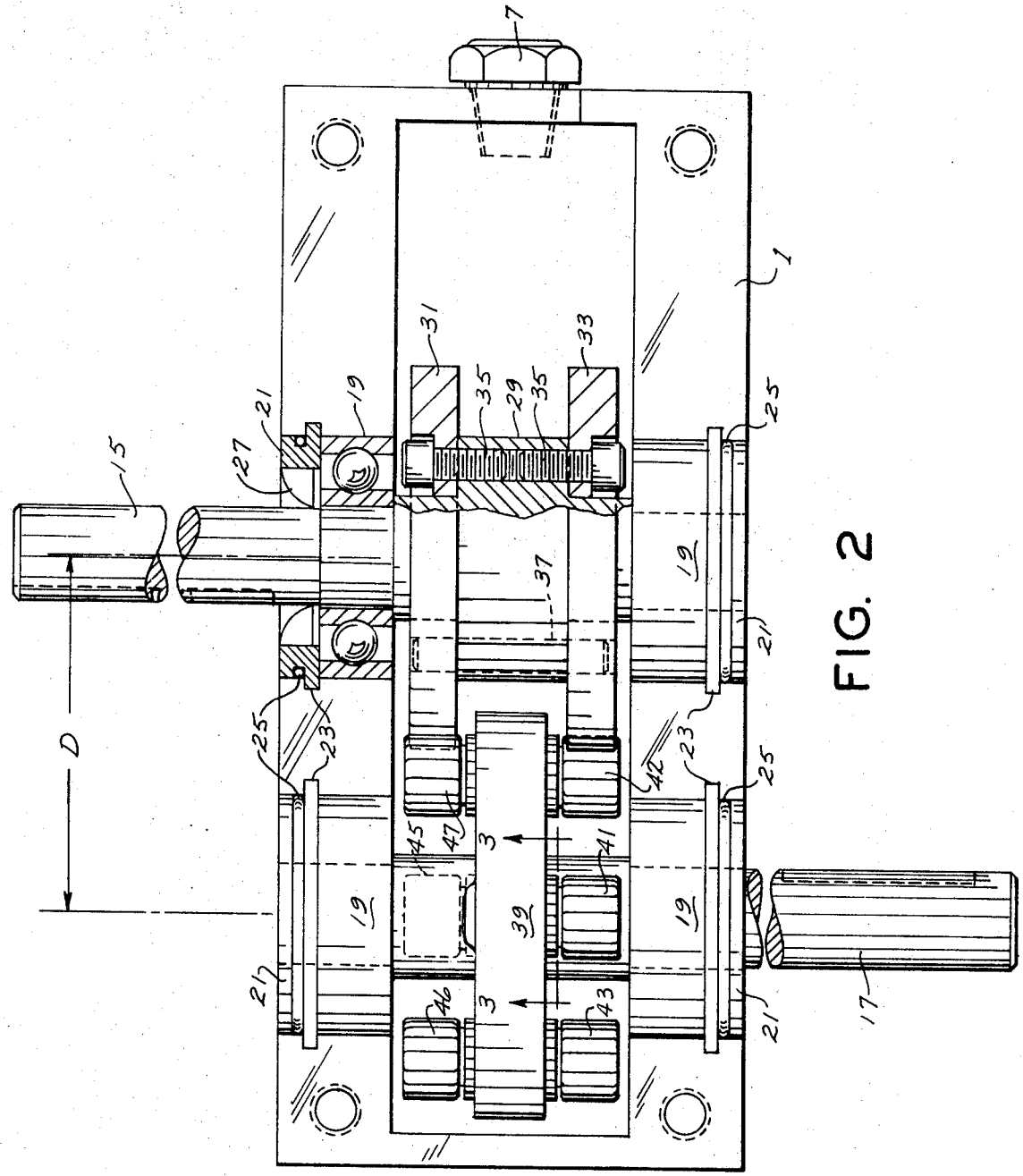
FIG. 2 is a plan view of the lower half of the drive unit shown in FIG. 1, the top half of its casing having been removed, the view being downward across plane 2—2, as indicated on FIG. 1.

Referring to FIGS. 1 and 2, numeral 1 indicates the bottom half, and numeral 3 the top half, of a horizontally split casing, the parts of which are held together along plane 2—2 by removable socket-head screws 5. Numeral 7 indicates a window plug for viewing the level L of an oil carried in the bottom half 1. At 9 is shown a pressure vent, at 11 an oil filling plug and at 13 an oil drain plug.

Rotatably borne in the assembled casing (1, 3) are a drive shaft 15 and a driven shaft 17. Four similar bearings (two for each shaft) are indicated at 19. One of these bearings 19 (up and to the right of center in FIG. 2) is illustrated in cross section to show their interior constructions. As shown they are of the ball type but it is to be understood that any other accurately and rigidly aligning bearings are useful, including other rolling or sleeve types. Each bearing 19 is held in place by a cap 21 which has a flange 23 nested in semicircular grooves in the casing halves 1 and 3. In the casing, when assembled, pairs of these semicircular grooves form complete circular grooves containing the flanges 23. Each cap 21 is also grooved for the containment of an O-ring seal 25 and contains a conventional oil seal such as shown at 27.

At numeral 29 is shown a support in the form of a flange, made integral with the drive shaft 15, although it may be made separately and keyed or otherwise attached. This flange 29 carries contoured cams 31 and 33 on its opposite flat faces. Attachment is effected by cap screws 35 and a dowel pin 37 for accurate location. The cams surround shaft 15. They are conjugate in the sense to be shown below and in the present example each is of the same shape but phased with respect to each other at 180°, as shown.

Formed integrally with the driven shaft 17 is a support in the form of a flange 39 which alternatively may be keyed or otherwise fastened. This driven flange 39 has opposite flat faces from one of which extends a triple set of follower rollers 41, 42, 43, with centers located at 120° intervals along an imaginary pitch circle C, as shown on FIG. 1. These followers successively engage cam 33. From the opposite face of the driven flange 39 extends a triple set of follower rollers 45, 46, 47 also located at 120° intervals along said pitch circle C. These successively engage cam 31. The roller sets 41, 42, 43 and 45, 46, 47 are phased at 60° with respect to one another. The shapes of the cams 31 and 33 are conjugate in the sense that as one cam such as 33 successively engages or is engaged by follower rollers of set 41, 42, 43, the other cam such as 31 will successively engage or be engaged by rollers of the set 45, 46, 47. Thus positive intermittent motion results as driving action by the cams alternates between members of these sets. Their conjugate outlines can be arrived at in various ways known in the cam art to provide various conditions of rest, constant velocity, acceleration, deceleration, etc. for the driven shaft 17 when the drive shaft 15 turns at a constant velocity. Thus the cam outlines shown are not limiting but constitute one example of any of a number that may be designed for providing different functional movements and dwell periods of the shaft 17. Barring backlash, there is always at least one of each set of followers 41, 42, 43 and 45, 46, 47 in engagement with a cam. The drive is positive for either chosen direction of rotation. It will be understood that the numbers of follower rollers in each set may vary along with variations in the conjugate cam outlines, as is known in the art.

A high degree of accuracy of said functional movements of the shaft 17 is desired because devices of this nature are used for driving apparatus which places parts to be automatically machined in various locations that need to be very accurately determined. This implies an absence of any looseness known as backlash between the cams and the followers at their points of contact. Preloading at all points of contact is also desirable so that during normal wear backlash will not develop. Heretofore preloading has been sought to be accomplished by means of various resilient cushioning elements which, among other disadvantages require variability in the center-to-center distance between the driving and driven shafts. Such variability is undesirable since then compensations need to be provided when installing a unit 1, 3 on a machine which it drives. I accomplish preloading with zero backlash while maintaining positively and accurately fixed the distance D between the driving and driven shafts as described below.

Figure 3:
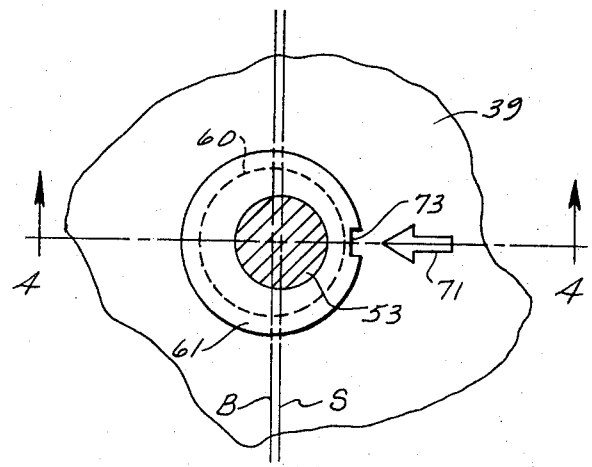
FIG. 3 is an enlarged vertical section on line 3—3 of FIG. 2.
Figure 4:
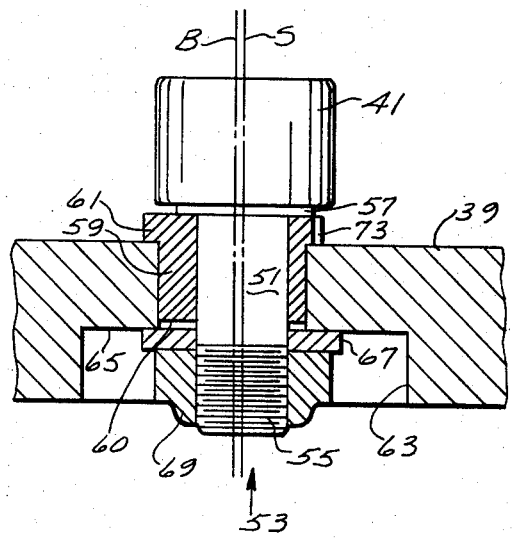
FIG. 4 is a cross section taken on line 4—4 of FIG. 3.
Corresponding reference characters indicate corresponding parts through the several views of the drawings.

Referring to FIGS. 3 and 4, these show more in detail one follower roller (41 for example) and its connecting means with the driven flange 39. This will serve as an example of all of the follower rollers. The roller 41 is rotatably supported on the outer end of a stud 53 by a suitable bearing which includes an outboard holding means (not shown, being conventional). The stud includes a shoulder 57 on the inboard side of the bearing for roller 41. The shoulder 57 is located between the roller 41 and the central body 51 of the stud 53. The stud is threaded at its end opposite the roller 41 as indicated at 55. The central body portion 51 of stud 53 has a close sliding fit in a hole through a bushing 59. The axis S of the stud is offset or eccentric to the axis B of the bushing. The axes B of all of the bushings 59 are permanently located on a fixed reference pitch circle C of radius R. The bushing 59 has a close but rotatable fit in a hole 60 (larger than the stud 53) in the flange 39. The bushing 59 is flanged as shown at 61. This flange 61 is located between the shoulder 57 and the adjacent face of the flange support 39. The hole 60 in the flange 39 (for the bushing 59) is counterbored as shown at 63. This counterbore 63 has a flat bottom 65. The inner end of the bushing 59 does not reach the plane of the bottom 65. Thus by applying a washer 67 and a lock nut 69 at the threaded end of the stud 53, and by turning the nut, the shoulder 57 of the stud may be drawn into tight clamping engagement with the flange 61 of the bushing 59. This locks the flange 61 against the side of the flange 39. Locking may occur at any desired angular position of the bushing 59 in its hole 60. By loosening the nut 69, the bushing may be released for rotary adjustment and by removal of the nut both the bushing 59 and the stud 53 with its roller 41 may be removed from support 39.

By loosening nut 69, the bushing 59 is unlocked and may be rotated in its hole 60 in the support 39. This revolves the stud axis S around the fixed bushing axis B. By equally adjusting all bushings from reference positions, the axes S of the studs may all be placed on selected pitch circles other than article C. Thus clearance between each and every follower surface and the surface of the cam which it contacts may be made zero, either with or without preloading. Also, by such equal adjustments the angular spacings between the rollers are maintained as aliquot parts of the circumference of any newly selected circle, regardless of its adjusted radius other than R. Preloading is preferred to prevent backlash from setting in under normal wear. By preloading is meant that the adjustment is made such that some initial contact pressure is established between each follower roller and its cam when the drive is stationary and not under load. A small enlargement of the pitch radius of the stud axes accomplishes this after an initial adjustment to eliminate backlash without preloading.

In order that the adjustments may be made the same for all followers to keep them centered on one pitch circle of any selected radius, the flange 39 is provided adjacent each bushing 59 with one or more index marks such as 71. The flange 61 of each bushing is also provided with a notch 73. By this means a person making adjustments is oriented by the angular positions of the notches with respect to the adjacent index marks. The notches also serve as means for accepting the lug of a spanner wrench for adjustably turning the bushings. Before an adjustment is made, the respective nut 69 is loosened and thereafter again drawn up to anchor the bushing in the newly adjusted position. By this means backlash may be eliminated between cam and roller surfaces equally with equality of preloading established. Since the driving surfaces of the cams and the driven surfaces of the follower rollers are hard, and since no resilient cushioning parts are included, the center-to-center distances and parallelism between various parts in the apparatus are precisely maintained. Therefore the shaft distance D is maintained constant and the unit may be interchangeably connected between preestablished motor-drive centers and input-shaft centers of standardized machines to be driven, without the need for error-compensating couplings or the like.

The use of bushings between the supporting studs of the follower rollers and the flange support 39 has an additional advantage. Heretofore, studs such as 53 were located (without bushings) directly in holes in supports such as 39. Consequently, if breakdown occured in the support, due to fatigue stresses caused by varying stud loads, then although the damage might be related only to one stud, the entire support for all followers was required to be replaced. This was inconvenient, costly and time-consuming. On the other hand, by means of the invention, when a bushing becomes damaged by a stud, it is a simple matter to remove the nut 69, the involved stud along with its roller follower and the surrounding bushing. These parts may then be quickly replaced at low cost without disturbing the support or the other follower elements carried thereby.

It should also be noted that the bushings have larger bearing areas of contact with the flange 39 than would the smaller studs if directly placed in holes therein. The larger bearing areas minimize breakdown of support material. The counterbore 63 forms a nest for the nut 69 and washer 67 for minimizing projections which would interfere with maximum swings of an adjusting wrench from above (see FIG. 2).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An indexing drive, comprising a drive shaft and a driven shaft, bearing means supporting said shafts for rotation about center lines which are permanently spaced apart at a fixed distance, cam means attached to said drive shaft and having contoured driving surface means, a support on and rotating said driven shaft, bushings removably interfitted in bushing holes respectively in said support, said holes having axes located on a circle and spaced at equal intervals thereon, each bushing being rotatable in its hole, an eccentric stud hole in each bushing and a stud extending into each stud hole to form a circular array of studs, a follower roller carried by one end of each stud for engagement with said driving surface means of the cam means, and means for locking and unlocking each bushing with respect to said support at any of various angular positions of the bushings, whereby the axis of each stud may be located on a chosen one of any of various pitch circles of different radii while maintaining the pitch distances between rollers equal to one another and as aliquot parts of the circumference of the chosen circle.

2. A drive according to claim 1, wherein said means for locking each bushing comprises a flange on the bushing engaging one side of said support, a shoulder on the stud in the bushing, said shoulder engaging said flange, and threaded draw means on the stud and engaging the other side of said support to clamp and release said flange and bushing relative to the support.

3. A drive according to claim 2, wherein said support is provided with at least one index means at each bushing is recessed for application of a turning tool and for determining angular movements of the bushing relative to the support by comparison of the position of said notch with said index means.

4. An indexing drive, comprising a drive shaft and a driven shaft, bearing means supporting said shafts for rotation about axes which are permanently spaced apart at a fixed distance, cam means attached to said drive shaft and having contoured driving surfaces, a support on and rotating with said driven shaft, a plurality of movable members on said support, a plurality of studs carried by said movable members respectively, said studs having axes extending parallel to the axis of the driven shaft and intersecting a pitch circle at aliquot intervals around the driven shaft, a cam follower on each stud, all of said movable members being adjustable to change the positions of said studs with respect to the support to effect the intersections of their axes with different pitch circles at aliquot intervals thereon, means for locking and unlocking each movable member relative to the support at any of the various changed positions of the axis of said studs, and index means operative between the support and each of said movable members for adjusting the positions of all of said movable members equally from a selected initial position thereof wherein the axes of the studs intersect a selected pitch circle at aliquot intervals thereon to positions intersecting another pitch circle at aliquot intervals thereon.

5. A drive according to claim 4, wherein said shaft axes are parallel and said driving surfaces of said cams are conjugate.

References Cited
UNITED STATES PATENTS

| | | | |
|---|---|---|---|
| 1,552,598 | 9/1925 | Drissner et al. | 74—84 |
| 1,753,691 | 4/1930 | Burns | 308—62X |
| 2,986,949 | 6/1961 | Lancaster et al. | 74—84 |
| 3,170,333 | 2/1965 | Umbright | 74—821(UX) |
| 3,467,450 | 9/1969 | Schmidt et al. | 308—62X |

FRED C. MATTERN, JR., Primary Examiner

F. D. SHOEMAKER, Assistant Examiner

U.S. Cl. X.R.

74—84, 125; 308—62